July 28, 1970    M. DODSON ET AL    3,521,674

SAMPLING VALVE

Filed June 24, 1968    2 Sheets-Sheet 1

INVENTORS
MICHAEL DODSON
GORDON E. MEHAFFY
BY *Thomas L. Peterson*
ATTORNEY

July 28, 1970　　　M. DODSON ET AL　　　3,521,674
SAMPLING VALVE

Filed June 24, 1968　　　　　　　　　2 Sheets-Sheet 2

INVENTORS
MICHAEL DODSON
GORDON E. MEHAFFY
BY
*Thomas L. Peterson*
ATTORNEY

United States Patent Office

3,521,674
Patented July 28, 1970

1

3,521,674
SAMPLING VALVE
Michael Dodson and Gordon E. Mehaffy, Fullerton, Calif., assignors to Beckman Instruments, Inc., a corporation of California
Filed June 24, 1968, Ser. No. 739,568
Int. Cl. F16k 11/06
U.S. Cl. 137—625.48                         13 Claims

ABSTRACT OF THE DISCLOSURE

A sampling valve useful for injecting accurately metered samples to gas chromatography apparatus or the like including a slidable valve element positioned between a fixed lower member and a movable upper member. The upper and lower members contain vertically aligned passages which are brought into communication by a passage in the valve element when the valve element is in a predetermined position. A single stud fixed to the lower member properly aligns one end of the valve element and the upper member, and also constitutes the sole means for controlling the limit of movement of the valve element, while the other ends of the upper member and valve element are slidably received in a vertical slot formed in a housing.

BACKGROUND OF THE INVENTION

The present invention relates generally to a sampling valve and, more particularly, to a sampling valve which is especially useful for injecting accurately metered samples into a gas chromatography apparatus or other analytical instrument.

The present invention constitutes an improvement upon the slider type of chromatographic sampling valve disclosed in U.S. Pat. No. 3,160,015 to Charlton et al. This patent discloses a valve arrangement in which a valve element is mounted for sliding movement in tracks formed in a lower fixed member and an upper vertically movable member. The valve element is formed of a self lubricating plastic material, such as polytetrafluorethylene or ethylene-propylene polymers. Two pairs of bolts connect the upper movable member to the lower member and leaf springs between the bolts of each pair urge the upper member downwardly so that the opposed faces of the valve element and the respective upper and lower members are retained in sealing engagement.

While the above described sampling valve operates generally satisfactorily, it has the disadvantage that it is time consuming to disassemble for cleaning in view of the use of four bolts for holding the assembly together. Also, the compression of the plastic valve element which results from the application of force applied through the leaf springs by the bolts which assemble the valve is not limited. As a consequence, an operator may apply too great a force upon the valve element. This can result in the plastic valve element extruding or flowing to some degree, thus causing the valve to fail prematurely either by the result of leaks forming in the valve or the valve seizing. Moreover, if too great a force is applied to the valve element, the passages therein may become restricted, thus varying the amount of sample which is supplied to the carrier gas which passes through the valve. Still further, in the Charlton et al. device, the movement of the slider valve element is limited by the contact of the piston which is attached to the valve element with the wall of the operator of the valve in which the piston is mounted. As a consequence, the position of the valve element, and thus the relative disposition of the passages therein with the passages in the upper and lower members of the valve, is dependent upon the machining tolerances of the piston and the walls of the valve operator. Thus, in a commercially available valve manufactured in accordance with the teachings of the Charlton et al. patent, in which the machine tolerances in the manufacture of the valve are maintained at about ±.005 inch, in view of the substantial number of parts involved in the connection between the wall of the operator engaged by the piston and the valve element itself, a tolerance build-up of about .093 inch may result. In this commercial valve, the diameter of the ports in the valve element is only .073 inch. Thus, it can be seen that there is a possibility that the dimension variations in the valve assembly might be sufficiently great as to result in the passages in the valve element becoming misaligned with the passages in the upper and lower members of the valve between which the valve element is shifted.

In view of the foregoing, it can be appreciated that it would be advantageous to provide a sampling valve which reduces the number of bolts required to assemble the same, so that the valve may be rapidly disassembled for cleaning or replacement of parts, and to have means for limiting the amount of compression applied to the plastic valve element so that it will not extrude or flow to cause failure of the valve assembly. Furthermore, it would be desirable to provide a valve assembly in which tolerance build-up would be minimized, thus reducing manufacturing costs and minimizing the chance of misalignment between the passages in the slidable valve element and the upper and lower valve members between which the valve element slides.

SUMMARY OF THE INVENTION

It is the principal object of the present invention to provide an improved sampling valve.

Another object of the invention is to provide a sampling valve which is easily and rapidly disassembled and minimizes tolerance build-ups which exist in the aforementioned prior art sampling valve.

According to the principal aspect of the present invention, there is provided a slider sampling valve generally of the type disclosed in the aforementioned Charlton et al. patent in which a single stud or bolt-like member is provided for assembling the upper movable member and the slidable valve element or slider to the lower fixed member. The stud passes through an elongated slot in the slidable valve element. The extent of longitudinal movement of the valve element is defined solely by the engagement of the bolt with the walls of the slot. As a result, the tolerance build-up between the passages in the valve element and the stud is substantially less than the tolerance build-up which occurs in the aforementioned prior sampling valve between those parts which determine the position of the valve element. The upper movable member of the valve assembly and the valve element have their ends which are opposite to the stud slidably engaged in a vertical slot formed in the wall of the valve operator. The walls of the slot restrain the upper member and valve element from lateral movement, thus cooperating with the stud to ensure alignment of the upper movable member and valve element with the fixed lower member of the assembly. Moreover, the stud provides a single reference point for longitudinally positioning the upper movable member, the valve element and the lower fixed member, thus ensuring proper alignment of passages in the various parts of the valve. It can be appreciated that by simply disengaging the stud from the fixed lower member of the assembly, the upper movable member and valve element may be rapidly disassembled for servicing and cleaning of the assembly.

Other objects, aspects and advantages of the invention will become apparent from the following description taken in connection with the accompanying drawings.

DESCRIPTION OF THE PREFERRED EMBODIMENTS

Figure 1:
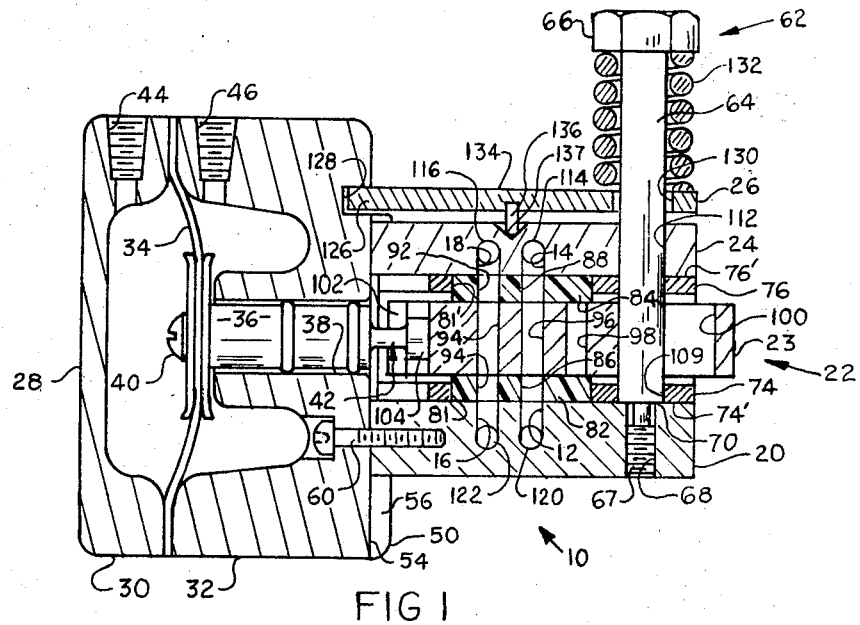
FIG. 1 is a longitudinal sectional view through the sampling valve of the present invention.

Referring now to FIGS. 1–4 in detail, there is illustrated therein a sampling valve assembly, generally designated 10, for injecting an accurately measured slug of a sample flowing through passages 12 and 14 into a carrier or other stream of fluid flowing through the passages 16 and 18. The carrier stream, which may be helium, for example, then transports the sample slug to a gas chromatograph apparatus, as well known in the art. It is understood, however, that the invention is applicable to other forms of apparatus, as for example one in which it is desired to inject a sample into an oxygen containing gas stream that conveys the sample to a combustion furnace where the sample is oxidized and thus is suitable for analysis by an instrument which is sensitive to oxides formed in the furnace.

The assembly 10 includes a lower fixed block or member 20, a slider assembly 22 which includes a slider or valve element 23, an upper movable member 24 and a pressure plate 26 all of which are assembled to the valve operator 28.

The operator 28 includes two housing sections 30 and 32 between which there is mounted a flexible diaphragm 34. A piston 36 slidably mounted in a horizontal bore 38 in housing section 32 is connected at one end to the diaphragm 34 by a fastener element 40. A button 42 is formed on the end of the piston 36 which extends outside of the housing section 32. The valve element 23 is connected to this button in a manner which will be described in detail later. Ports 44 and 46 are provided in the housing sections 30 and 32, respectively, for conveying suitable fluid under pressure to either side of the diaphragm 34. The slider 23 is shifted along its longitudinal axis by selectively applying fluid pressure to opposite sides of the diaphragm 34.

Figure 3:
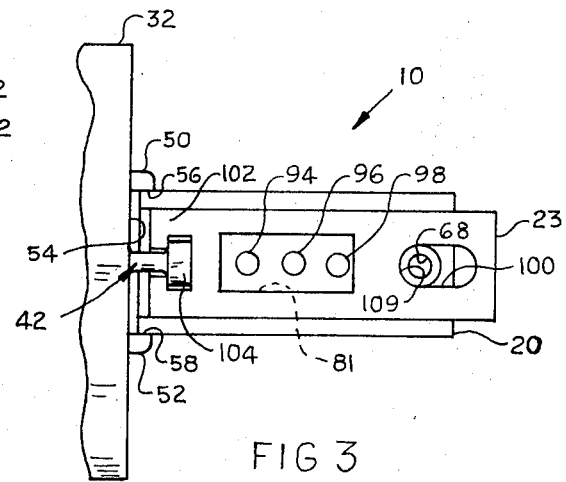
FIG. 3 is a fragmented top plan view of the sampling valve as it appears when partially disassembled, with only the slider being positioned on top of the fixed lower member of the assembly.
Figure 4:
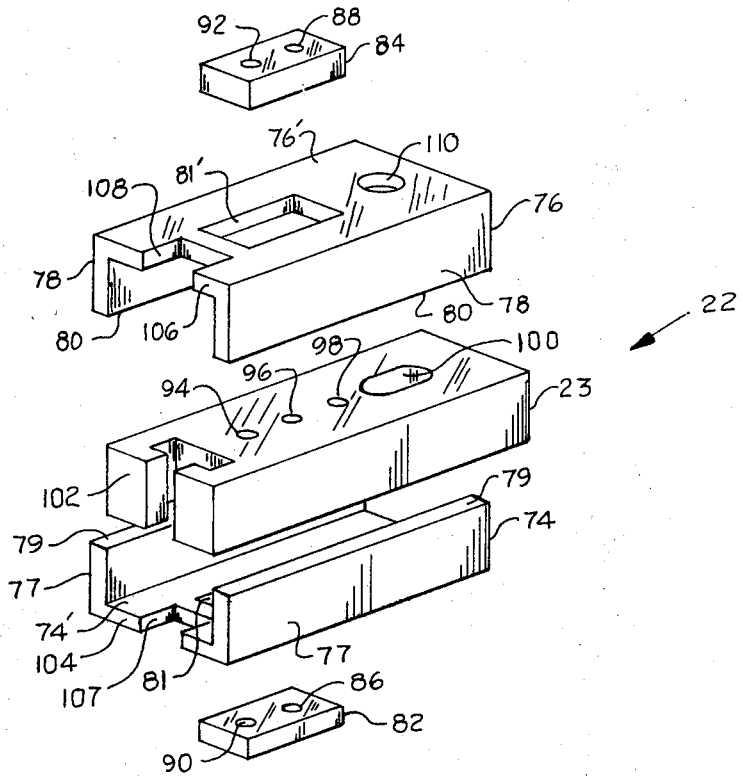
FIG. 4 is an exploded view, slightly enlarged, of the slider assembly employed in FIG. 1.

The housing section 32 is formed with a pair of vertically extending spaced flanges 50 and 52, best seen in FIG. 3, which define therebetween a slot 54 having sides 56 and 58. The lower block 20 of the valve assembly has a width slightly less than the width of the slot 54. One end of the member 20 is mounted in the slot 54 and retained therein by means of a pair of bolts 60, only one being seen in the drawings each of which extends outwardly through the wall of the valve operator. A vertically extending stud or bolt-like member 62 includes a shank section 64 terminating at its upper end in a head 66 and a lower reduced diameter threaded section 67 which is engaged in a threaded hole 68 adjacent to the outer end of member 20. A downwardly facing annular shoulder 70 is provided between the shank section 64 and lower threaded section 67 of the stud. This shoulder serves as means for limiting the extent of threading of the stud 62 into the hole 68.

The slider assembly 22 includes the metal slider or valve element 23, lower seal retainer 74 having a generally U-shaped cross-section and an upper seal retainer 76 having a generally inverted U-shaped cross-section. The respective sides 77 and 78 of the lower and upper seal retainers abut one another at their facing edges 79 and 80 and define therebetween a trackway in which the slider 23 is longitudinally movable. The bases 74' and 76' of retainers 74 and 76 are formed with vertically aligned rectangular cut-outs 81 and 81' in which there is positioned seals 82 and 84, respectively. The seals are preferably formed of self-lubricating plastic materials such as polytetrafluoroethylene or fluoronated ethylenepropylene polymers. The seals have a configuration complementary to that of the cut-outs 81 and 81', respectively, so that the seals are firmly retained in position by the walls of the cut-outs. Passages 86 and 88 in the seals 82 and 84, respectively, are longitudinally aligned with the passages 12 and 14 in the lower and upper members 20 and 24 of the valve assembly while passages 90 and 92 are provided in the seals and are aligned with the passages 16 and 18 in the members 20 and 24, respectively.

The slider 23 is provided with three spaced vertically extending passages 94, 96 and 98 and with a longitudinally extending slot 100 adjacent to its outer end. This slot receives the shank 64 of the stud 62 and allows for reciprocal movement of the slider with respect to the stud. The opposite or forward end of the slider 23 extends into the slot 54 in the valve operator and is shaped to provide a yoke 102 which embraces the head portion 104 of the button 42. The yoke 102 is assembled to the button 42 by merely moving the slider 23 downwardly in the slot 54 during initial assembly of the valve 10. Conversely, the yoke 102 is disassembled from the button 42 by merely moving the slider upwardly in the slot. Thus, the yoke 102 and button 42 constitute means for quickly releasably connecting and disconnecting the slider to the piston 36. The forward ends 104 and 106 of the retainers 74 and 76 also extend into the slot 54 and have a width substantially equal to that of the slot so that the sides 56 and 58 of the slot prevent lateral movement of the retainers. The forward ends of the retainers 74 and 76 are formed with recesses 107 and 108 which are sufficiently large to permit either of the retainers to be slipped past the button 42 during vertical movement of the retainers together with the slider in the slot 54.

Vertically extending bores 109 and 110 are formed in the retainers 74 and 76, respectively, adjacent to their outer ends and slidably receive therein the shank 64. The diameter of the shank 64 is only slightly less than that of the bores 109 and 110 so that both lateral and longitudinal movement of the retainers is prevented by the stud 62.

The upper movable member 24 of the valve assembly has a width slightly less than the slot 54 so that the forward end of the member may be received in the slot and restrained against lateral movement by the sides of the slot. A vertical bore 112 is formed in the member 24 adjacent to its outer end. This bore is aligned with the bores 109 and 110. The shank 64 of the stud extends through the bore 112 and serves together with the sides of the slot 54 to align the member 24 with the slider assembly 22 and lower member 20.

It is an important feature of the invention that the stud 62 provides a single reference point which locates the slider 23, upper and lower members 24 and 20 and seals 82 and 84. Hence, the tolerance build-up between the various passages in the slider 23, members 20 and 24, and the seals is substantially less than the tolerance build-up which occurs when the position of the slider is determined by the relative position of piston 36 and the inner walls of either of the housing sections 30 or 32 and when the position of upper member 24 is determined by four bolts as in the aforementioned prior art sampling valve. In fact, in the present invention, when manufacturing tolerances are maintained at ±.005 inch, the maximum misalignment which might occur between the respective passage in the slider 23 and seals 82 and 84 is about .020 inch. Thus, if the diameter of the passages is .073 inch, even with the parts machined to their maximum tolerance, the passages in the various mating valve components will be aligned to a sufficient degree to permit operation of the valve.

Figure 2:
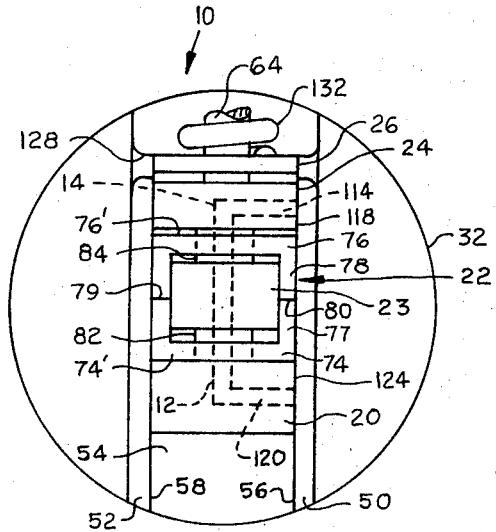
FIG. 2 is an end elevation of the sampling valve as viewed from the right side of FIG. 1.

Horizontally extending passages 114 and 116 are provided in member 24 which communicate with the respective vertical passages 14 and 18, and open at the side 118 of the member, as best seen in FIG. 2, for connection to sample and carrier gas lines, not shown. Likewise, horizontally extending passages 120 and 122 communicate with the passages 12 and 16 in the lower member 20 and open at the side 124 thereof for connection to the sample and carrier gas lines.

The forward end 126 of the pressure plate 26 is loosely positioned in a laterally extending slot 128 formed in the wall of the valve operator 28 so that the opposite end of the plate is free for vertical movement. A vertically extending bore 130 of a substantially larger diameter than the shank 64 is provided adjacent to the outer end of the plate 26 and receives the shank therein. The spacing between the wall of the shank and the wall of the bore 130 is sufficient to permit pivotal movement of the plate 26 about its forward end positioned in the slot 128. A coil spring 132 surrounds the shank and bears against the underside of head 66 and against the upper surface of the plate 26. A beveled pin 134 is pressed into an opening 136 in the bottom of the plate 26 and engages a conical recess 137 in the upper surface of member 24. The pin and recess are positioned directly over the middle of the seals 82 and 84 so that the force of the spring 132 is transmitted through the pressure plate 26 and pin 134 to a point where the force is distributed generally uniformly over the seals.

As best seen in FIG. 1, the lower seal 82 is thicker than the base 74' of retainer 74 so that the lower surface of the slider 23 will engage the seal in sealing relationship and will not bear against the base 74'. The upper seal 84 is thicker than the base 76' of retainer 76 and further is sufficiently thick so that the upper surface of the slider will bear only against the lower surface of the seal 84 and the lower surface of the movable member 24 will bear directly against the upper surface of seal 84 rather than against the retainer 76. As a consequence, the force of spring 132 is transmitted to the member 24, seal 84, slider 23 and seal 82 in a manner which ensures an excellent sealing engagement between the opposed surfaces of these parts.

As was mentioned previously, in some prior sampling valves, excessive pressures are applied to the plastic valve elements to cause them to extrude, thus causing failure of the valves. In the present invention, the shoulder 70 on the stud 62 limits the extent of threading of the stud into the lower member 20, thus limiting the compression of spring 132 and hence the force applied to the seals 82 and 84. The distance between the shoulder 70 and head 66 is selected so as to permit adequate force to be applied to the seals in the valve to ensure a tight sealing relationship between the various parts, yet insufficient to cause extrusion of the seals. Thus, an assembler cannot inadvertently overcompress the seals in the valve of the present invention and, as a consequence, cause premature failure of the valve.

In operation of the valve 10 when the slider 23 is in its fully extended position as shown in FIG. 1 wherein its position is determined by the engagement of the forward end of slot 100 with the stud 62, the passage 96 is aligned with passages 12, 86, 88 and 14 while the passage 94 in the slider is aligned with passages 16, 90, 92 and 18. Thus, in this position of the slider, the sample and carrier streams respectively flow through the passages 96 and 94, and the passage 98 is out of communication with the passages in seals 82 and 84. However, when the slider is retracted by applying fluid under pressure to the port 46 to shift the piston 36 in the leftward direction as viewed in FIG. 1, the passage 96 in the slider becomes aligned with passages 90 and 92 and the passage 98 in the slider becomes aligned with passages 86 and 88 so that the sample and carrier streams respectively flow through passages 98 and 96, and passage 94 is out of communication with passages 86, 88, 90 and 92. Thus, if the slider 23 is moved from its first position to the second mentioned position suddenly, a slug of sample fluid is trapped in the passage 96 and is injected virtually intact into the carrier stream for delivery to a gas chromatograph apparatus or other suitable analytical instrument, the volume of such sample slug depending upon the length and diameter selected for the passage 96. The slider is then returned to its original position shown in FIG. 1 preparatory to a subsequent injection of another slug of the sample fluid into the carrier stream.

Figure 5:
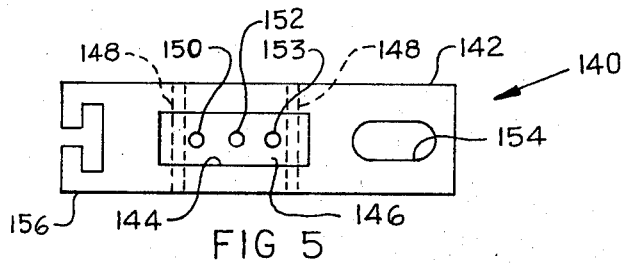
FIG. 5 is a top plan view of a modified form of a slider assembly which may be utilized in the valve illustrated in FIGS. 1–3.
Figure 6:
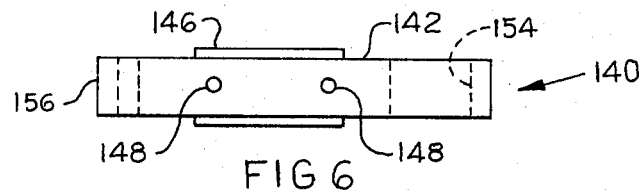
FIG. 6 is a side elevation of the slider assembly illustrated in FIG. 5.

Referring now to FIGS. 5 and 6, there is illustrated a modified form of the slider assembly which may be utilized in the valve 10 of the present invention. This slider assembly, generally designated 140, comprises a metal slider 142 having a central cut-out 144 which receives a plastic seal 146. The seal has a thickness greater than the slider 142 so that the upper and lower surfaces of the seal will bear directly against the lower surface of the member 24 and upper surface of member 20, respectively. The seal 146 is retained in the slider by means of horizontally extending pins 148. Passages 150, 152 and 153 are provided in the seal 136 for cooperation with the passages 12, 14, 16 and 18 in the valve 10. A longitudinally extending slot 154 is formed in one end of the slider for receiving the stud 62 while the other end of the slider is formed to provide a yoke 156 which is engageable with the button 42 in the same manner as the yoke 102 in the slider assembly 22. It can thus be seen that the slider assembly 140 differs from the assembly 22 in that it is an integral element in which the plastic seal 146 moves with the slider 142 relative to the members 20 and 24.

From the foregoing it can be seen that the slot 54 and stud 62 in the valve assembly of the present invention serve to accurately align the parts 20, 22 and 24 yet facilitate rapid disassembly of the valve since the stud 62 may be quickly disconnected from the lower fixed member 20 and the pressure plate 26, the slider assembly 22 and member 24 may be rapidly removed from the slots 128 and 54 on the valve operator 28. The single spring 132 and pivotally mounted pressure plate 26 also provide for a uniformly distributed spring loading upon the seals 82 and 84 and, as above stated, the shoulder 70 on the stud ensures that excessive pressures are not applied to the seals which would cause premature failure of the valve. Yet, in spite of the simplicity of construction of the valve 10 and its ability to be readily assembled and disassembled, it is constructed in such a manner that there is substantially lesser chance of misalignment between the various passages in the valve due to tolerance build-ups than in previous valves such as disclosed in Charlton et al.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures and devices.

What is claimed is:

1. In a sampling valve assembly, the combination of:
   a valve operator formed with a pair of spaced vertical flanges on a wall thereof defining therebetween a vertical slot;
   said valve operator including actuator means extending through said wall into said slot;
   a lower member fixed at one end to said operator adjacent to said slot;
   a vertically movable upper member having one end slidably engaged in said slot with said flanges restraining said upper member from lateral movement;
   said upper and lower members including vertically extending aligned passages therein;
   a slidable valve element disposed between said upper and lower members and having at least one vertical passage therein, said valve element being connected at one end to said actuator means and movable thereby between a position wherein said passage in said valve element is out of communication with said passages in said members and a position wherein said passage in said valve element is in communication with and interconnects said passages in said members;
   a vertical stud fixed to said lower member adjacent its other end and passing through a longitudinally extending slot in said valve member and a bore in said upper member, said stud serving to limit the extent of longitudinal movement of said valve elements; and
   means biasing said upper member toward said lower member.

2. A sampling valve as set forth in claim 1 wherein said valve element is readily releasably connected to said actuator means and said stud is readily releasably connected to said lower member.

3. A sampling valve as set forth in claim 1 wherein said one end of said valve element is slidably disconnectable from said actuator means by upward movement of the valve element.

4. A sampling valve as set forth in claim 1 wherein said biasing means includes:
   a pressure plate above said upper member and pivotally connected at one end to said valve operator, said pressure plate having a vertically extending bore in the other end thereof receiving said stud;
   said stud embodying a shank terminating in a head spaced above said pressure plate;
   a coil spring surrounding said shank above said pressure plate and engaging said head and plate to bias the latter toward said upper member; and
   means between said pressure plate and said upper member and intermediate said operator and said shank for transmitting the force of said coil spring against said upper member.

5. A sampling valve as set forth in claim 4 wherein said force transmitting means is located so as to apply the force of said spring generally at the point on said upper member where said passage therein is located.

6. A sampling valve as set forth in claim 4 wherein said wall of said valve operator is formed with a laterally extending slot therein above said upper member, and said pressure plate being slidably engaged in said slot in a manner so as to permit vertical pivotal movement of said plate.

7. A sampling valve as set forth in claim 6 wherein said valve element is engaged in said vertical slot and slidably disconnectable from said actuator means by upward movement of the valve element in said vertical slot.

8. A sampling valve as set forth in claim 1 including:
   upper and lower retainer elements between said upper and lower members, said valve element being disposed between said retainer elements and slidable with respect thereto;
   one end of said retainer elements being engaged in said vertical slot and restrained from lateral movement by said flanges;
   vertically aligned bores in the other end of said retainer elements receiving said stud;
   said retainer elements having cutouts therein in generally vertical alignment with the passages in said upper and lower members;
   sealing elements removably positioned in said cutouts and having bores therein aligned with the passages in said upper and lower members; and
   the sealing element in the upper retainer element being in sealing engagement with said upper member and said valve element, and the sealing element in the lower retainer element being in sealing engagement with said lower member and said valve element.

9. In a sampling valve the combination of:
   a fixed lower member;
   a movable upper member spaced above said lower member;
   said members having vertically aligned passages therein;
   a longitudinally slidable valve element between said members and having a passage therein, said valve element being connectable at one end thereof to an operator for shifting said valve element between a position wherein said passage therein is out of communication with said passages in said members and a position wherein said passage in said valve element is in communication with and interconnects said passages in said members;
   means restraining said one end of said valve element and the corresponding end of said upper member against lateral movement yet allowing for vertical and longitudinal movement thereof;
   a single vertically extending stud fixed to said lower member and passing through a longitudinally extending slot in said valve element and bore in said upper member adjacent to the other ends thereof, said stud serving to limit the extent of longitudinal movement of said valve element but preventing lateral movement of said other end thereof, and preventing both lateral and longitudinal movement of said other end of said upper member; and
   means biasing said upper member toward said lower member.

10. A sampling valve as set forth in claim 9 wherein:
    said stud is readily releasably connected to said fixed lower member; and
    said valve element and upper member are slidably removable from said restraining means when said stud is disconnected from said lower member.

11. A sampling valve as set forth in claim 10 wherein said biasing means includes:
    a pressure plate above said upper member and having a vertically extending bore therein adjacent one end receiving said stud;
    readily releasable means pivotally mounting the other end of said pressure plate;
    said stud embodying a shank terminating in a head spaced above said pressure plate;
    a spring carried by said shank above said pressure plate and engaging said head and plate to bias the latter toward said upper member;
    the passages in said upper member being located between said shank and said one end of said upper member; and
    means between said pressure plate and said upper member for transmitting the force of said spring to a point on said upper member generally above said passage.

12. A sampling valve as set forth in claim 11 wherein:

said restraining means includes means defining a vertical slot with said one end of said valve element and said upper member being engaged in said slot; and
said pivotally mounting means includes means defining a generally laterally extending slot receiving said other end of said pressure plate.

13. A sampling valve as set forth in claim 9 wherein:
said stud has a threaded lower end engaged in a threaded hole in said lower member and a head adjacent to its upper end positioned above said upper member;
said biasing means including a spring bearing against the underside of said head; and
said stud is formed with a downwardly facing shoulder above said lower end which limits the extent of threading of said lower end into said hole whereby the compression of said spring is limited.

References Cited

UNITED STATES PATENTS

| | | | |
|---|---|---|---|
| 3,000,218 | 9/1961 | Marks et al. | 73—422 |
| 3,150,517 | 9/1964 | Kuffer et al. | 73—422 X |
| 3,160,015 | 12/1964 | Charlton et al. | 73—422 |

FOREIGN PATENTS

| | | |
|---|---|---|
| 146,064 | 10/1961 | U.S.S.R. |

M. CARY NELSON, Primary Examiner

W. R. CLINE, Assistant Examiner

U.S. Cl. X.R.

251—61, 176, 367; 73—422

PO-1050
(5/69)

UNITED STATES PATENT OFFICE
CERTIFICATE OF CORRECTION

Patent No. 3,521,674    Dated July 28, 1970

Inventor(s) Michael Dodson and Gordon E. Mehaffy

It is certified that error appears in the above-identified patent and that said Letters Patent are hereby corrected as shown below:

Column 8, Claim 9, Line 41, insert -- a -- before "bore"

SIGNED AND
SEALED
OCT 13 1970

(SEAL)
Attest:

Edward M. Fletcher, Jr.
Attesting Officer

WILLIAM E. SCHUYLER, JR.
Commissioner of Patents